United States Patent Office 3,187,640
Patented June 8, 1965

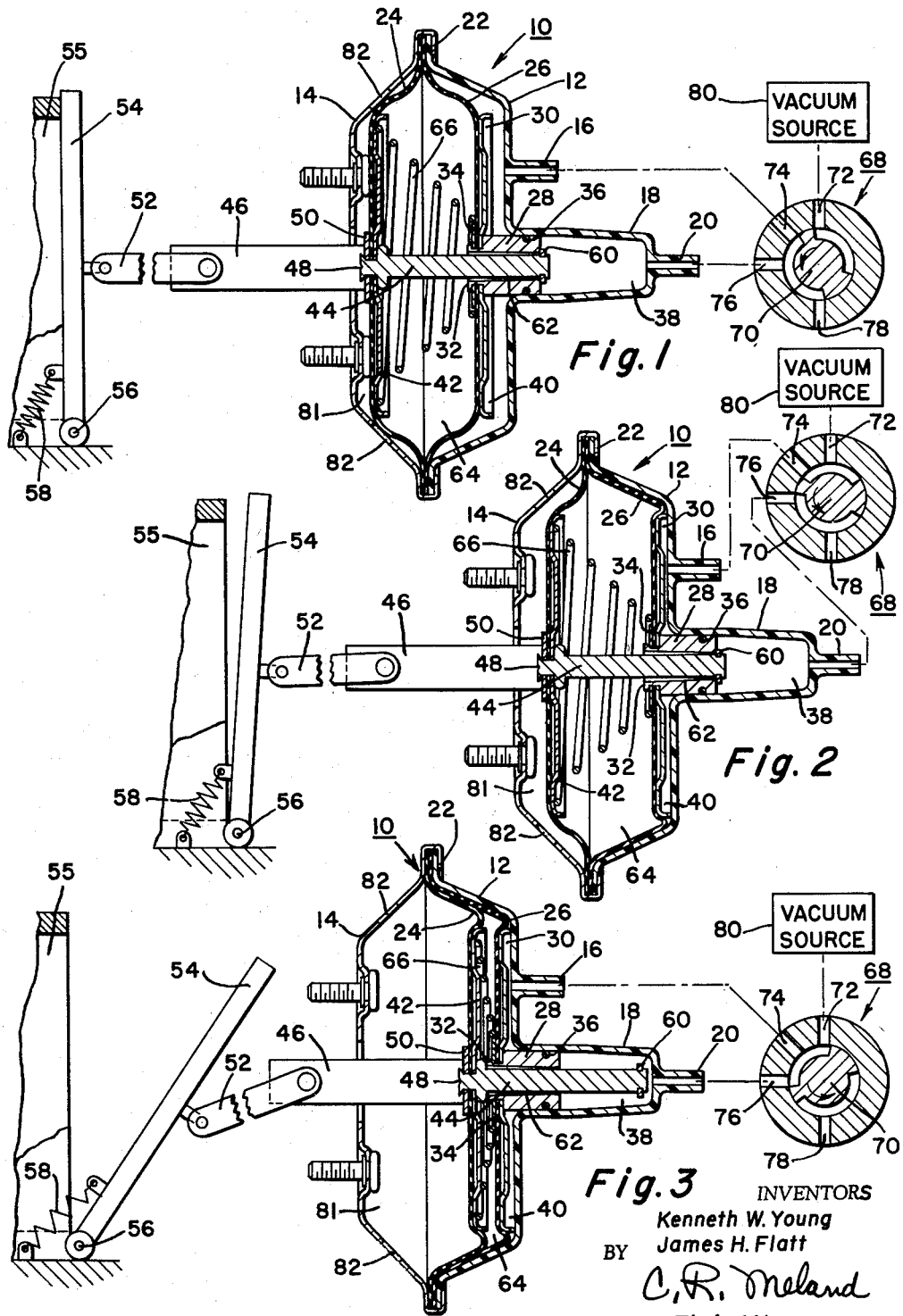

3,187,640
MULTI-STROKE ACTUATOR
Kenneth W. Young and James H. Flatt, Anderson, Ind., assignors to General Motors Corporation, Detroit, Mich., a corporation of Delaware
Filed Apr. 24, 1962, Ser. No. 189,907
9 Claims. (Cl. 92—48)

This invention relates to multi-stroke actuators and more particularly to a multi-stroke vacuum actuator that is useful in shifting fresh air dampers and the like on motor vehicles or other apparatus.

Fluid pressure and vacuum motors are well known to those skilled in the art and in some cases, multi-stroke vacuum actuators have been provided. For the most part, these multi-stroke vacuum actuators have not received wide acceptance because of their complex construction both as to piping and as to actual physical construction. It accordingly is one of the objects of this invention to provide a multi-stroke vacuum actuator which is comprised of a minimum number of parts and which is economical to manufacture.

Another object of this invention is to provide a vacuum actuator which has a single housing or casing which encloses two diaphragms, the area defined by said diaphragms being connectible with a source of vacuum through an opening formed in one of the diaphragms and the area or chamber defined by the casing and one of the diaphragms also being connectible with a source of vacuum.

Another object of this invention is to provide a multi-stroke vacuum actuator which has two diaphragms each connected respectively with members that have a telescoping relationship, there being a space or clearance provided between the members which serves to connect the chamber or area defined by the diaphragms with a source of vacuum.

Still another object of this invention is to provide a multi-stroke vacuum actuator wherein at least a part of the casing of the actuator is formed of a moldable plastic material.

A further object of this invention is to provide a multi-stroke vacuum actuator wherein the conduits or pipes that are to be connected with a vacuum source are both formed on the same casing part.

Further objects and advantages of the present invention will be apparent from the following description, reference being had to the accompanying drawings wherein preferred embodiments of the present invention are clearly shown.

In the drawings:

FIGURE 1 is a sectional view of a vacuum actuator made in accordance with this invention.

FIGURE 2 is a view similar to FIGURE 1 but showing one of the diaphragms in a shifted position.

FIGURE 3 is a view similar to FIGURE 1 but showing another of the diaphragms in a shifted position.

Referring now to the drawings and more particularly to FIGURE 1, the reference numeral 10 generally designates a vacuum actuator made in accordance with this invention. The vacuum actuator includes a casing which is formed of casing parts 12 and 14. The casing part 14 is formed of sheet metal material whereas the casing part 12 is formed of a plastic molding material. The casing 12 may be formed of any of the well known plastic molding materials that are commercially available. It is seen from FIGURE 1, that the casing 12 has an integral conduit portion 16 and a hollow axially extending portion 18 which terminates in another conduit portion 20.

The casing parts 12 and 14 are secured together by rolling or crimping over the circumferentially extending edge 22 of the casing 14. This also serves to hold the diaphragms 24 and 26 in place since the outer circumferentially extending edges of the diaphragms are clamped between the casing parts as is clearly apparent from FIGURE 1. The diaphragms 24 and 26 may be formed of any suitable elastomeric material such as rubber.

The diaphragm 26 is connected with a guide member 28 which is formed of a suitable metal material. The guide member 28 has a shoulder which abuts a metal back-up plate 30 and is fixed to the diaphragm by spinning over a portion 32 of the guide member 28 against a metal washer 34. The metal back-up plate 30 serves to lend rigidity to the diaphragm 26. The guide member 28 has a circular outer configuration and slides within the projecting portion 18 of the plastic case 12. An O-ring seal 36 fits within a groove formed in the guide member 28 and slides on the inner surface of the axially extending portion 18. This seal serves to seal the chamber 38 from the chamber 40 which is formed and defined by the casing part 12 and the diaphragm 26.

The diaphragm 24 carries a metal back-up plate 42 and is connected with a circular shaft 44 and with an L-shaped connector 46. The end of the shaft 44 is riveted over as at 48 against a metal washer 50. It is seen that this riveting over serves to secure all of the parts in place so that the shaft 44, back-up plate 42, and connector 46 are all fastened to the diaphragm 24.

The connector 46 is pivotally connected with a link 52 which in turn is pivotally connected to a fresh air damper 54 which controls the flow of air through conduit 55. The fresh air damper 54 is pivoted at 56 and is urged to a closed position by a spring 58. The spring 58 tends to bias the connector 46 leftwardly in FIGURE 1. It will be appreciated that the connector 46 can be used to operate devices other than the fresh air damper 54 and different spring arrangements may be used to bias the connector leftwardly in FIGURE 1.

One end of the cylindrical shaft 44 has a groove which receives a part 60 that at times engages the guide 28. This part 60 can take various forms and could be, for example, a serrated spring washer or could be a C-shaped snap ring. It is noted that the shaft 44 passes through an opening 62 formed in the guide member 28. The opening 62 tapers outwardly when moving from right to left in FIGURE 1 and the smallest inside diameter of the opening 62 is larger than the outer diameter of the shaft 44. This provides a clearance between the shaft 44 and the opening 62 of the guide member 28 which may be, for example, .010 to .015 inch. It can be seen that this clearance provides a passage means for connecting the chamber 38 in axially extending part 18 with the chamber 64 which is defined by the diaphragms 24 and 26. A spring 66 is interposed betwen the back-up plate 42 and the diaphragm 26. One end of this spring encircles the washer 34 as is clearly apparent from FIGURE 1. The spring 66 serves to bias diaphragms 24 and 26 away from each other.

The conduits 16 and 20 are connected with a vacuum control valve which is generally designated by reference numeral 68. This vacuum control valve has a rotatable valve part 70 and ports 72, 74, 76 and 78. The port 78 is always connected with atmosphere whereas the port 72 is connected with a vacuum source 80 which, on a motor vehicle, may be the intake manifold of the engine. The port 74 is connected by suitable conduit means with the conduit 16 whereas the port 76 is connected by suitable conduit means with the conduit 20.

When the rotatable valve part 70 is in the position depicted in FIGURE 1, the vacuum actuator 10 does not shift the damper 54 and the parts of the actuator are in an at rest position. In the FIGURE 1 position, the chamber 64 is connected with atmosphere via the clearance between shaft 44 and guide 28 and through the conduit 20 and port 76. The chamber 40 is likewise at an atmospheric pressure through conduit 16 and ports 74 and 78. The diaphragms 24 and 26 take the positions illustrated in FIGURE 1.

When it is desired to open the damper 54 a predetermined amount, the valve part 70 is shifted to the FIGURE 2 position. It is seen that in this position of the valve part 70, the chamber 64 is still connected with atmosphere via the clearance between parts 44 and 28, through chamber 38, through conduit 20 and through ports 76 and 78. It is seen, however, that the chamber 40 is connected with vacuum through conduit 16 and ports 74 and 72. This will cause the diaphragm 26 to be shifted rightwardly from its FIGURE 1 to its FIGURE 2 position. As the diaphragm 26 moves rightwardly, the guide member 28 slides in the axially extending part 18 and engages the part 60 to move the shaft 44 with the guide member 28. As a result, the diaphragms 24 and 26 are both shifted rightwardly to their FIGURE 2 positions. The diaphragm 24 is not impeded in its rightward movement since the chamber 81 formed by the casing 14 and the diaphragm 24 is always connected with atmosphere via holes 82 formed in the casing 14.

If further actuation of the damper 54 is desired, the valve part 70 is shifted to the FIGURE 3 position. In the FIGURE 3 position, the chamber 40 is connected with vacuum and the chamber 64 is likewise connected with vacuum via the clearance between parts 44 and 28, through chamber 38, through conduit 20 and through ports 76 and 72. This will cause the diaphragm 24 to move rightwardly from the FIGURE 2 to the FIGURE 3 position against the bias of spring 66 which then is compressed. This will shift the damper 54 to the FIGURE 3 position and the diaphragms will be shifted closely adacent each other as is depicted in FIGURE 3. When the diaphragm 24 moves from the FIGURE 2 to the FIGURE 3 position, the shaft 44 telescopes or moves relative to the guide 28 as is readily apparent from an inspection of FIGURES 2 and 3.

If it is desired to move the damper 54 from the FIGURE 3 to the FIGURE 2 position, the valve 70 can be rotated back to its FIGURE 2 position whereupon the spring 66 will move the diaphragm 24 back to its FIGURE 2 position since the chamber 64 will then be connected with atmosphere. The damper 54 can be moved back to its FIGURE 1 position by shifting the valve 70 to the FIGURE 1 position. It can be seen from the foregoing that the vacuum actuator 10 provides a two stroke actuation for the damper 54 under the control of the valve 68. It is also seen that the connection between chambers 38 and 64 is made by the clearance that is provided between the shaft 44 and the opening in the guide 28. This opening is made in a tapered form to prevent binding of the parts during actuation of the vacuum actuator.

In the embodiments illustrated in FIGURES 1 through 3, the spring 58 returns the parts of the vacuum actuator to the at rest position as is illustrated in FIGURE 1. It will be appreciated that these parts could be returned to the at rest position by connecting a vacuum source with the chamber 81. In such a modification, there would be no holes 82 in the casing part 14 and one conduit connected to chamber 81 would be required which would be connected to a source of vacuum when it was desired to return the parts to the FIGURE 1 position.

While the embodiments of the present invention as herein disclosed, constitute a preferred form, it is to be understood that other forms might be adopted.

What is claimed is as follows:

1. A vacuum actuator comprising, casing means, first and second diaphragms secured to said casing means and movable relative thereto, a first chamber defined by said first diaphragm and said casing means, a second chamber defined by said first and second diaphragms, a guide member shiftable with said first diaphragm slidably supported by said casing means, a shaft member secured to said second diaphragm and passing through an opening formed in said guide member, said guide member and shaft member having a predetermined clearance providing passage means for said second chamber that is connected to an area exterior of said first chamber, and means projecting from said shaft member and engageable with said guide member whereby said guide member and shaft member are shifted together when said first diaphragm is shifted in one direction.

2. A vacuum actuator comprising, casing means defined by first and second casing parts, said first casing part being formed of a plastic moldable material and having an integral conduit portion and an integral axially extending portion which terminates in a second integral conduit portion, first and second diaphragms having outer circumferentially extending parts clamped between said first and second casing parts, a first chamber defined by said first diaphragm and said first casing part, a guide member secured to said first diaphragm and slidable within the axially extending portion of said first casing part, a second chamber defined by said diaphragms, a shaft member secured to said second diaphragm passing through said first diaphragm and through an opening in said guide member, said shaft member and guide member having a predetermined clearance providing a passage means connecting the interior of the axially extending portion of said first casing part with said second chamber, and a spring interposed between said first and second diaphragms.

3. The combination according to claim 2 wherein the opening in said guide member is a tapered opening.

4. A vacuum actuator comprising casing means, first and second diaphragms shiftable relative to said casing means, a first chamber defined by one of said diaphragms and at least a portion of said casing means, a second chamber defined by said first and second diaphragms, a guide member shiftable with said first diaphragms supported by at least a portion of said casing means in its shiftable movement, shaft means extending in one direction from said second diaphragm and passing through an opening formed in said guide member, said shaft means and guide member being spaced to provide a passage means that connects said second chamber with an area exterior of said first chamber, and a connector member for shifting a device to be actuated secured to said second diaphragm and extending from said second diaphragm in a direction opposite to said shaft means.

5. The combination according to claim 4 wherein the shaft means has a portion riveted over which holds said shaft means and connector member secured to said second diaphragm.

6. A vacuum actuator comprising, casing means having an axially extending portion, first and second diaphragms secured to said casing means and shiftable relative thereto, a first chamber defined by said first diaphragm and said casing means, a second chamber defined by said first and second diaphragms, conduit means adapted to be connected to a source of vacuum connected with said first chamber, a guide member secured to said first diaphragm and shiftable in said axially extending portion of said casing means, a shaft member secured to said second diaphragm passing through an opening formed in said guide member, said shaft member and guide member having a predetermined clearance which connects the interior of the axially extending portion of said casing means with said second chamber, and resilient means interposed between said first and second diaphragms.

7. A vacuum actuator comprising, casing means having an axially extending portion, first and second diaphragms secured to said casing means and shiftable relative thereto, a first chamber defined by said first diaphragm and said casing means, a second chamber defined by said first and second diaphragms, conduit means adapted to be connected with said first chamber, a guide member secured to said first diaphragm and shiftable in said axially extending portion of said casing means, a shaft member secured to said second diaphragm passing through an opening formed in said guide member, said shaft member and guide member having a predetermined clearance which connects the interior of the axially extending portion of said casing means with said second chamber, and an abutment means on said shaft member engageable with said guide member for moving said shaft member in one direction when said first diaphragm and guide member move in said one direction.

8. A vacuum actuator comprising, casing means, first and second diaphragms secured to said casing means and movable relative thereto, a first chamber defined at least in part by said first diaphragm, a second chamber located between said first and second diaphragms, a guide member shiftable with respect to said casing means, a shaft secured to said second diaphragm passing through an opening formed in said guide member, said guide member and shaft having a predetermined clearance providing passage means for said second chamber that is connected to an area exterior of said first chamber, and means projecting from said shaft and engageable with said guide member whereby said guide member and shaft are shifted together when said first diaphragm is shifted in one direction.

9. An actuator comprising, a casing means, first and second diaphragms shiftable relative to said casing means, a first chamber defined by one of said diaphragms and at least a portion of said casing means, a second chamber located between said first and second diaphragms, a guide member secured to said first diaphragm and shiftable therewith, a shaft means secured to said second diaphragm passing through an opening formed in said first diaphragm and an opening formed in said guide member, said shaft means and guide member being spaced to provide a passage means that connects said second chamber with an area exterior of said first chamber, and means extending from said shaft means and engageable with said guide member whereby said shaft means is moved by said guide member when said first diaphragm is moved in one direction, said shaft means telescoping within said guide member when said second diaphragm is moved toward said first diaphragm as when said second chamber is connected with vacuum, said second diaphragm being adapted to be connected with a part to be actuated.

References Cited by the Examiner

UNITED STATES PATENTS

| 1,956,977 | 5/34 | Shawn | 137—787 |
| 2,197,075 | 4/40 | Fitzgerald | 91—377 |
| 2,658,525 | 11/53 | Shannon | 137—787 |
| 3,077,186 | 2/63 | De Beaubien | 121—48 |
| 3,080,890 | 3/63 | Papa | 137—784 |

FOREIGN PATENTS 999,277   10/51   France.

FRED E. ENGELTHALER, *Primary Examiner.*

MILTON BUCHLER, *Examiner.*